United States Patent [19]

Ball et al.

[11] Patent Number: 4,682,680
[45] Date of Patent: Jul. 28, 1987

[54] FRICTION CLUTCH WITH MANUALLY DISCONNECTABLE RELEASE MEANS

[75] Inventors: Robert J. Ball, Leamington Spa, England; John J. Winters, Edmonds, Wash.

[73] Assignee: Automotive Products plc, Leamington Spa, England

[21] Appl. No.: 742,699

[22] Filed: Jun. 7, 1985

[30] Foreign Application Priority Data

Jun. 7, 1984 [GB] United Kingdom ............... 8414507

[51] Int. Cl.⁴ ............................................ F16D 19/00
[52] U.S. Cl. .................................. 192/98; 192/89 B; 192/70.13; 192/DIG. 1
[58] Field of Search ............... 192/98, 89 B, 70.13, 192/DIG. 1, 70.27; 403/349, 348

[56] References Cited

U.S. PATENT DOCUMENTS

| 4,228,882 | 10/1980 | Huber et al. | 192/98 |
| 4,456,111 | 6/1984 | Limbacher | 192/70.13 X |
| 4,478,325 | 10/1984 | Dagiel | 192/98 |
| 4,502,583 | 3/1985 | Limbacher | 192/98 |
| 4,529,075 | 7/1985 | Renaud | 192/70.13 X |
| 4,529,076 | 7/1985 | Renaud | 192/98 |
| 4,560,053 | 12/1985 | Lassiaz | 192/89 B X |
| 4,569,429 | 2/1986 | Brandenstein et al. | 192/98 |

FOREIGN PATENT DOCUMENTS

| 2557236 | 6/1977 | Fed. Rep. of Germany | 192/98 |
| 46155 | 12/1935 | France | 403/348 |
| 126841 | 5/1959 | U.S.S.R. | 403/349 |

Primary Examiner—Leslie Braun
Assistant Examiner—Dwight G. Diehl
Attorney, Agent, or Firm—Solon B. Kemon

[57] ABSTRACT

A friction clutch for a vehicle utilizes a snap connection and self indexing to insure accurate presentation during installation. The release mechanism of the clutch includes a first member for applying release forces to a second member which releases the clutch.

19 Claims, 7 Drawing Figures

FRICTION CLUTCH WITH MANUALLY DISCONNECTABLE RELEASE MEANS

The invention relates to a friction clutch for a vehicle.

Figure 7:
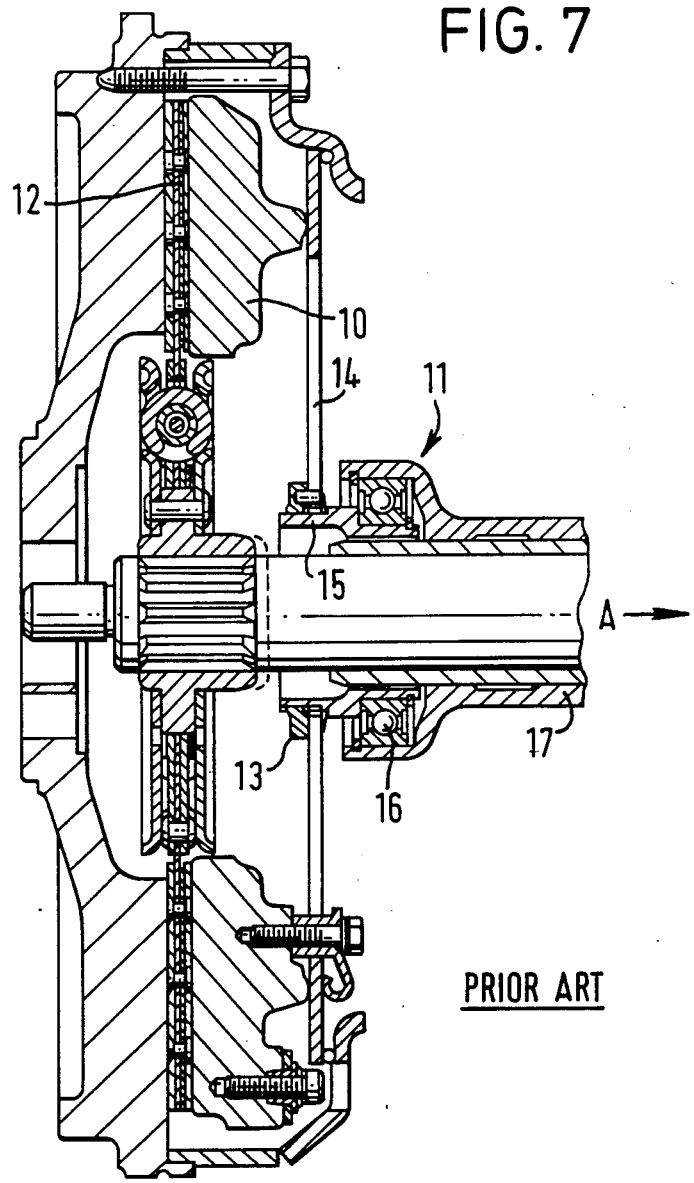

Various types of clutches for motor vehicles have been proposed over the years. FIG. 7 of the accompanying drawings illustrates a typical prior art pull clutch arrangement where a clutch pressure plate 10 is retracted by a clutch release mechanism 11 to release the clutch driven plate 12. Clutch release is effected by applying a pull force in direction A to the hub 13 of a clutch spring 14 through a short hollow shaft 15, clutch release bearing 16 and a clutch release member 17. The clutch releasing force is applied by means of a release fork (not shown) which engages the clutch release member 17.

The present invention is concerned with a friction clutch of the foregoing type having an improved clutch release mechanism.

A vehicle clutch in use transmits rotational drive from the vehicle engine to the gear assembly, and needs to be constructed to ensure reliable operation over long periods. Such clutches are therefore manufactured to be robust and reliable in operation, but in consequence are often relatively bulky and awkward to manoeuvre accurately into position during assembly, and thereafter difficult to connect. Furthermore, in order to service the clutch after prolonged usage, it is necessary to provide access sufficient to permit the clutch to be disconnected.

It is thus an object of the invention to provide a friction clutch having a "snap" connection. It is a further object of the invention to make the friction clutch self-indexing to ensure accurate presentation during installation.

It is a feature of our invention to use a bayonet sleeve; such sleeve reduces the need to machine the various precision components currently used, and requires only a minimum radial space. The sleeve permits simple detachment when the clutch release mechanism of which it forms a component needs to be disconnected for servicing of the friction clutch.

According to one feature of the invention there is provided a friction clutch for a vehicle which includes a clutch release mechanism comprising a first member for applying release forces to a second member to release the clutch, one of said members defining a locating recess for a projection on the other member, said projection being locatable in the recess by moving the one member axially and rotatably relative to the projection, said recess extending behind a retainer section of said one member which inhibits disengagement of the projection from the recess on application of axial clutch release forces. The members are therefore connectable by a bayonet type fit which produces a particularly straightforward method of assembly and dismantling.

Preferably a plurality of recesses are provided to locate one or a plurality of said projections. Where a plurality of said projections is provided, a portion of the one member preferably forms a lead in section for the recess and extends axially beyond further portions of said one member which form lead-in sections for further said recesses in the one member so as to locate one projection during assembly and thereby align the remaining projections with their associated recesses. A plurality of said recesses may have lead-in defining portions which extend axially beyond the portions defining the remaining lead in defining portions to locate a said projection. Preferably the extended lead-in defining portions are arranged consecutively in the rotational direction.

Preferably each said lead-in section has projection-engaging surfaces which converge towards a substantially pointed end and which lead to one recess or an adjacent recess.

Preferably the retainer section of the recess or of the remaining or selected said recesses includes a retention surface which inhibits disconnection of the or each projection from its recess as a result of any torque transmission from one said member to the other.

The first member may form part of an assembly engageable by a clutch release fork and the second member may be axially fast with or may comprise a clutch spring hub.

The or each projection may be carried by the second member.

According to a further feature of the invention we provide a friction clutch for a vehicle having a friction plate, means to press the friction plate in a first direction parallel to the clutch axis, clutch release means, and pull means to withdraw the clutch release means in a direction opposed to said first direction characterised in that the clutch release means includes first and second members, one of the members defining a recess, the other of the members having a projection, the projection being receivable in the recess upon relative axial movement between the members, the recess having a first portion extending from one edge of the member at an angle to the said axis and a second portion at a larger angle to said axis, said second portion including a retainer surface to inhibit disengagement of the projection from the recess on application of axial pull clutch forces, the second portion being dimensioned to permit lateral disengagement of the projection from said second portion of the recess upon subsequent relative axial movement between the members.

Figure 1:
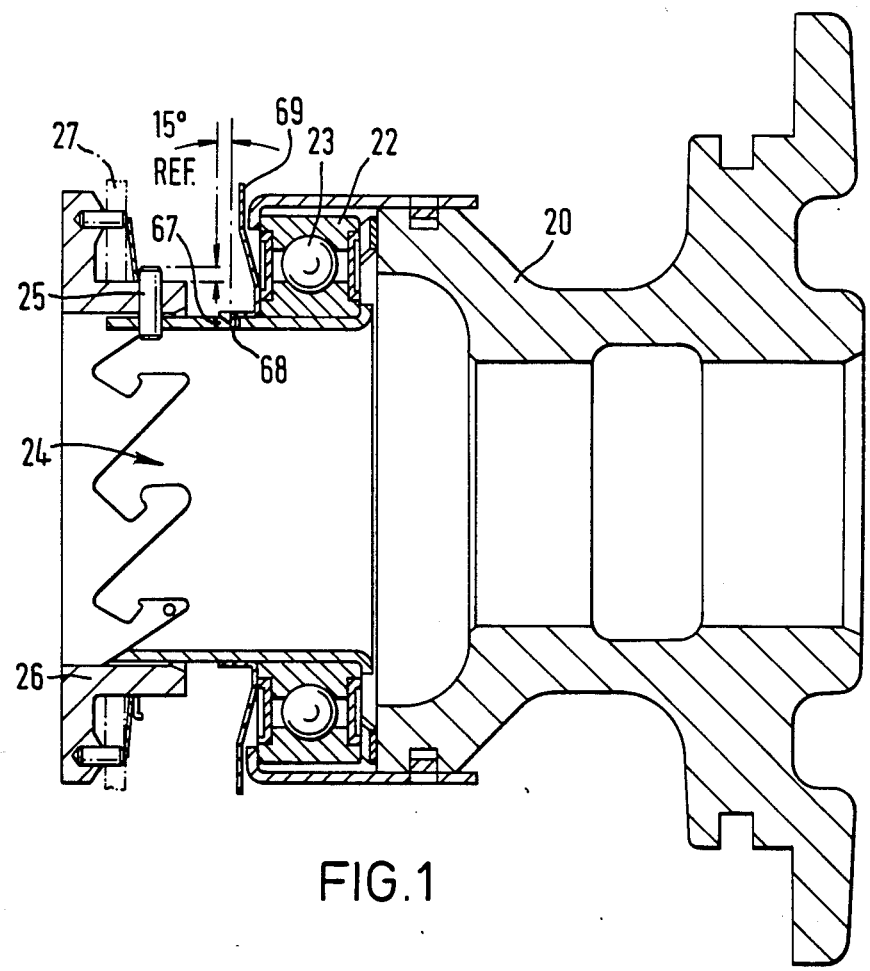
Figure 2:
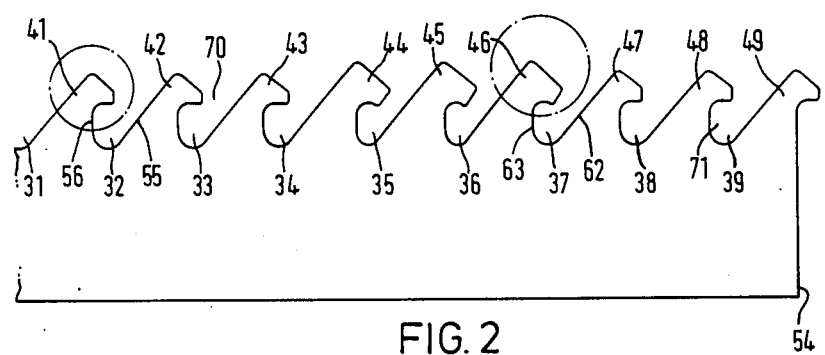
Figure 3:
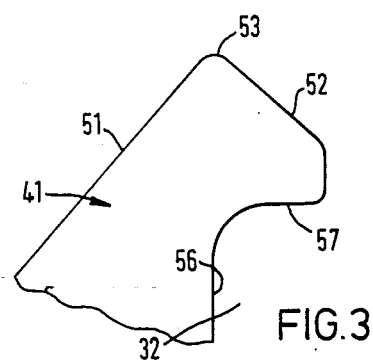
Figure 4:
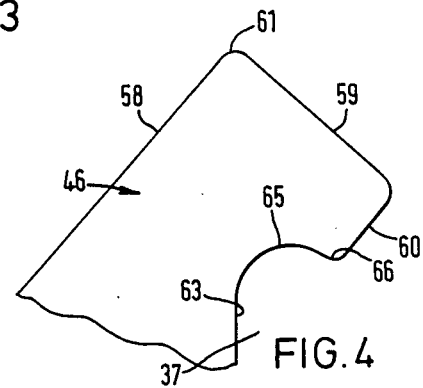
Figure 5:
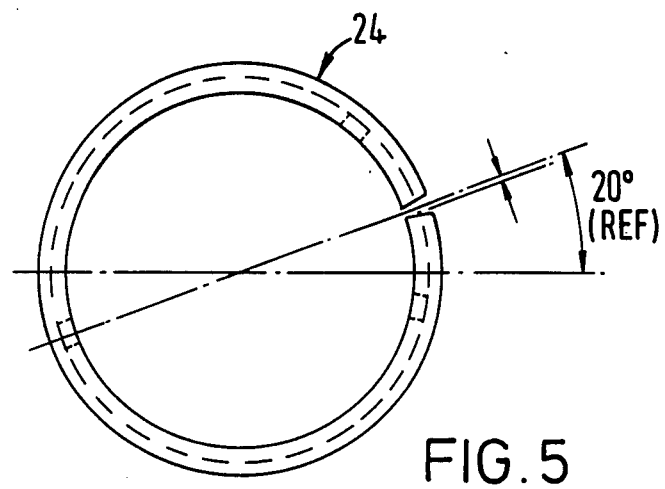
Figure 6:
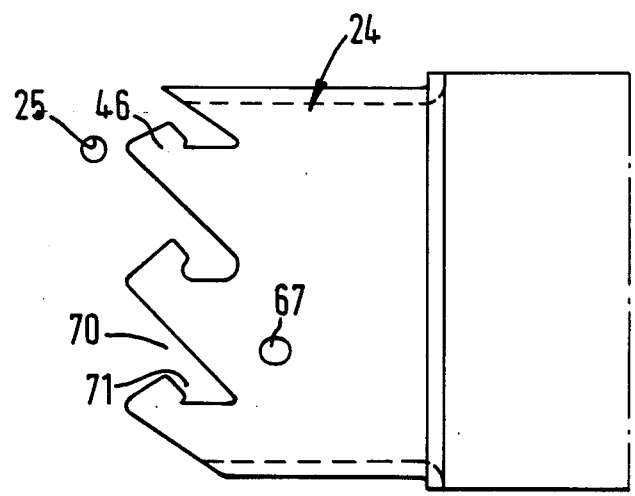

A friction clutch in accordance with the invention will now be described by way of example with reference to the accompanying drawings in which:

FIG. 1 is a cross section through part of a friction clutch in accordance with the invention, FIG. 2 is a development of a first member of a release mechanism for clutch of FIG. 2, FIG. 3 and 4 are enlarged views of part of the development of FIG. 2, FIG. 5 is an end view of the first member, and FIG. 6 is an elevation of the first member relative to a projection carried by a spring hub of the friction clutch, and FIG. 7 is a cross section through a known form of friction clutch and clutch release mechanism.

In FIG. 1 the clutch release mechanism comprises a release fork engaging member 20 which is axially fast with an outer race 22 of a release bearing 23, and a clutch release member 24 which engages a plurality, e.g. three, of radial pins 25 which are equally spaced circumferentially around a hub 26 of a clutch diaphragm spring 27.

The clutch release member 24 is formed from sheet metal which is bent into cylindrical form, the developed sheet being shown in FIG. 2. The member is stamped into the form shown and comprises a plurality of pin retaining recesses 31 to 39 defined between lead-in fingers 41 to 49. It will be seen clearly from FIG. 2 that fingers 44, 45 and 46 project beyond the remaining fingers. As seen from FIG. 3, the finger 41 has two lead-in surfaces 51, 52 converging to a leading end 53 which is inserted axially to the left as viewed in FIG. 1 to locate the clutch release member on the pins 25. The surface 51 leads into recess 31 and the surface 52 leads into recess 32. The recess 31 is defined between the surface 51 and a surface 54 on finger 49 when the sheet is bent into cylindrical form. The recesses 31 to 34, 38 and 39 are identical. Recess 32 is defined between a lead in surface 55 on finger 42 and a surface 56 on finger 41. The surface 56 lies on the axis of finger 41 and terminates at its leading end at a transverse surface 57 through which clutch release forces can be transmitted. Fingers 41, 42, 43, 47, 48 and 49 are identical.

Looking at FIG. 4, the finger 46 has two lead-in surfaces 58, 59, a leading end 61 and a surface 60 parallel with surface 58. The recess 37 is defined between the lead-in surface 62 of finger 47 and a surface 63 on the finger 46. The surface 63 lies on the axis of the finger 46 and terminates at its leading end at a location surface 65 which is curved so as to form a retainer surface portion 66 as well as a surface through which clutch release forces can be transmitted. Fingers 44 and 45 are identical to finger 46.

The clutch release member is formed with three equispaced apertures 67 which locate respective inwardly directed sprags 68 (FIG. 1) of an annular flange 69 which is used to rotate the clutch release member relative to the hub 26.

The assembly and operation of the release mechanism of the clutch will now be described.

The clutch release member 24 assembled on the bearing 23 as in FIG. 1 is inserted into the spring hub 26. The arrangement of the three consecutive extended fingers 44, 45 and 46 is such that one of them will always engage a pin 25 as the release member is moved to the left. For the purposes of this description it will be assumed that a pin engages the leading end of finger 46 so that following initial engagement the pin will slip off the leading end 61 of the finger and slide either along surface 58 or surface 59. If the engaged pin 25 slides along surface 58 the pin will eventually come to rest at the blind end of recess 36 and the two other pins 25 will simultaneously enter recesses 33 and 39. If the pin 25 slides along surface 59, the pin will eventually come to rest at the blind end of recess 37 and the other pins 25 will simultaneously enter recesses 31 and 34. The axial movement of the release member 24 is combined with a slight rotational movement thereof during relative sliding movement between the surface 58 or 59 and pin 25 to facilitate entry of the pins into the recess. By utilising the three extended fingers, the release member 24 is automatically indexed giving automatic alignment of the remaining pins with their recesses.

Once the pins are located at the blind ends of the respective recesses, axial movement of the member 24 in the clutch release direction will cause the pins to engage the transverse location surfaces at the opposite ends of the recesses through which releasing forces can be transmitted to the pins. Such transverse location surfaces are shown at 57 and 65.

The resilience of the clutch spring will normally maintain the pins against the relevant transverse surfaces. Should any unusually high torque be transmitted through the clutch release mechanism through, say, sudden clutch release there will be a tendency for the pins 25 to move circumferentially relative to the member 24. In order to prevent the pins leaving the recesses in such circumstances, the surface 66 on finger 46 or similar surfaces on the fingers 44, 45 inhibit such relative circumferential movement as the relevant pin must move axially relative to the member 24 against the bias of the clutch spring to clear the retaining surface.

To remove the clutch release member 24, the release fork is disengaged from member 20 and the bias caused by the clutch spring effectively removed. The clutch release member 24 is then rotated appropriately relative to the hub 26 by grasping the flange 69 manually and the member 24 is allowed to move axially so that the pins and recesses disengage. The clutch release member 24 can then be completely removed.

In this description the first portion 70 of each recess extends from one edge of the member defining the recess at angle to the axial direction of the clutch in which the friction plate is pressed into and withdrawn from engagement with an engine driven rotatable part, and the second portion of the recess 71, including the location surface 57 to inhibit disengagement of the projection from the recess, is disposed at an angle to the axial direction larger than the first said angle. As best seen in Fig. 3, the body end 53 will normally lie in the same plane as surface 56.

We claim:

1. A friction clutch for a vehicle comprising: a friction plate; means to press said friction plate in a first direction parallel to the clutch axis; clutch release means for applying clutch release forces in a withdrawal direction opposed to said first direction, said clutch release means including a first member and a second member which applies clutch release forces to said first member, one of said members having a recess, the other of said members having a projection, said projection being receivable in said recess upon relative movement in an axial direction between said members, said recess being defined between a lead-in surface extending at an angle to the said axial direction and a location surface transverse to said axial direction and providing an axial location for said projection, a retainer surface adjacent said traverse space, said retainer surface being arranged to inhibit disengagement of said projection from said recess on application of said clutch release forces; whereby interengagement of said first and second members by relative axial movement therebetween will cause said projection and lead-in surface to interengage and effect relative rotation between said members until said projection fully engages said recess whereupon subsequent movement of said second member axially in the withdrawal direction will cause the projection to engage said location surface and enable clutch release forces to be transmitted to the first member from said second member through said location surface.

2. A friction clutch according to claim 1 in which said one member includes a plurality of recesses to locate one or a plurality of said projections.

3. A friction clutch according to claim 2 and in the case where a plurality of projections is provided, in which a portion of said one member defining a lead-in surface for one of said recesses extends axially beyond further portions of said one member which define lead-in surfaces for further said recesses, the first said portion being arranged to locate one of said projections during assembly of the first and second members and thereby align a remaining projection with its associated recess.

4. A friction clutch according to claim 3 in which a plurality of said portions of said one member have lead-in defining surfaces which extend axially beyond said further portions of said one member.

5. A friction clutch according to claim 4 in which the extended lead-in defining portions are arranged consecutively in a rotational direction.

6. A friction clutch according to claim 2 in which the retainer surfaces are provided for selected recesses to inhibit dislocation of an associated projection from its recess as a result of any torque transmission between said first and second members.

7. A friction clutch according to claim 6 in which said retainer surface which inhibits dislocation is axially offset from an adjacent part of the location surface in the withdrawal direction.

8. A friction clutch according to claim 1 in which a lead-in surface is provided for an adjacent recess and further surface extend between the first said lead-in surface and the lead-in surface of the adjacent recess.

9. A friction clutch according to claim 8 in which the further surfaces include a surface is engageable with a projection which locates in said recess.

10. A friction clutch according to claim 9 in which the further surface extends from an end of the recess aligned in the axial direction with said location surface.

11. A friction clutch according to claim 10 in which a portion of the further surface adjacent said end of the recess extends in the axial direction.

12. A friction clutch according to claim 8 in which the lead-in surface of the recess and the lead-in surface of the adjacent recess are parallel.

13. A friction clutch according to claim 1 in which a further lead-in surface is provided for said recess, said further lead-in surface extending from said location surface and converging towards the lead-in surface of an adjacent recess.

14. A friction clutch according to claim 13 in which the further lead-in surface and the lead-in surface of the adjacent recess converge towards a substantially pointed end.

15. A friction clutch according to claim 1 in which said retainer surface inhibits dislocation of said projection from said recess as a result of any torque transmission between the first and second members.

16. A friction clutch according to claim 15 in which said retainer surface which inhibits dislocation is axially offset from an adjacent part of the location surface in the withdrawal direction.

17. A friction clutch for a vehicle comprising: a friction plate; means to press said friction plate in a first direction parallel to the clutch axis; clutch release means; pull means to withdraw said clutch release means in a direction opposed to the first direction, said clutch release means including first and second members, one of said members being cylindrical and including recesses, the other of said members having a projection, said projection being receivable in one of said recesses upon relative axial movement between said members, each recess having a first portion extending from one edge of said member at an angle to the said axis, and a second portion extending from said first portion at an angle to the axial direction larger than said first said angle, said second section including a retainer surface to inhibit disengagement of said projection from the recess on application of axial pull clutch forces, said second portion having a dimension in the axial direction sufficient to permit lateral disengagement of said projection from said second portion upon subsequent relative axial movement between said members, each recess having a lead-in section, the lead-in section for a plurality of consecutive and adjacent recesses extending axially in said first direction beyond the lead-in sections for the other recesses.

18. A friction clutch for a vehicle comprising: a friction plate; means to press said friction plate in a first direction parallel to the clutch axis; clutch release means; pull means to withdraw said clutch release means in a direction opposed to said first direction, said clutch release means including first and second members, one of said members being cylindrical and including recesses, the other of said members having a projection, said projection being receivable in one of said recesses upon relative axial movement between said members, each recess having a first portion extending from one edge of the member at an angle to the said axis, and a second portion extending at an angle to the axial direction larger than the first said angle said second section including a retainer surface to inhibit disengagement of the projection from the recess on application of axial pull clutch forces, said second portion having a dimension in the axial direction sufficient to permit lateral disengagement of said projection from said second portion upon subsequent relative axial movement between said members, each recess having a lead-in section, the lead-in section for a plurality of consecutive and adjacent recesses extending axially in said first direction beyond the lead-in sections for the other recesses, each lead-in section including a pair of surfaces converging in said first direction towards a substantially pointed end, one of said pair of surfaces leading to one recess and the second of said pair of surfaces leading to an adjacent recess.

19. A friction clutch for a vehicle including a clutch release mechanism comprising: a first member and a second member, said first member including means for applying release forces to said second member to release the clutch, one of said members including a plurality of projections and the other member including a plurality of locating recesses for said projection, each said projection being locatable in its recess by moving said other member axially and rotatably relative to the projections whereby the projections lie in axial alignment with a retainer section of said one member which inhibits disengagement of the projections from the recess on application of axial clutch release forces, a portion of said other member forming a lead-in section for one of the said recesses and extending axially beyond further portions of said member which form lead-in sections for the further said recesses in said other member so as to locate one projection during assembly and thereby align the remaining projections with their associated recesses.

* * * * *